US012630477B2

(12) United States Patent　　　　(10) Patent No.: US 12,630,477 B2

Misumi et al.　　　　　　　　　　　　(45) Date of Patent:　　　May 19, 2026

(54) MnZn-BASED FERRITE

(71) Applicant: TOKIN Corporation, Shiroishi (JP)

(72) Inventors: Shota Misumi, Shiroishi (JP); Tatsuya Chiba, Shiroishi (JP); Kenichi Murai, Shiroishi (JP)

(73) Assignee: TOKIN CORPORATION, Shiroishi (JP)

( * ) Notice: Subject to any disclaimer, the term of this patent is extended or adjusted under 35 U.S.C. 154(b) by 578 days.

(21) Appl. No.: 18/247,858

(22) PCT Filed: Aug. 16, 2021

(86) PCT No.: PCT/JP2021/029889
§ 371 (c)(1),
(2) Date: Apr. 4, 2023

(87) PCT Pub. No.: WO2022/085281

PCT Pub. Date: Apr. 28, 2022

(65) Prior Publication Data

US 2023/0373864 A1　　Nov. 23, 2023

(30) Foreign Application Priority Data

Oct. 20, 2020　(JP) ................................. 2020-176040

(51) Int. Cl.
*H01F 1/34*　　　(2006.01)
*C01G 49/00*　　(2006.01)
*C04B 35/26*　　(2006.01)

(52) U.S. Cl.
CPC ...... *C04B 35/2658* (2013.01); *C01G 49/0018* (2013.01); *H01F 1/344* (2013.01);
(Continued)

(58) Field of Classification Search
CPC ............ C01G 49/0018; C01G 49/0063; C01G 49/0072; C04B 35/26; C04B 35/2658;
(Continued)

(56) References Cited

U.S. PATENT DOCUMENTS 3,574,116 A　　4/1971　Sugano et al.

FOREIGN PATENT DOCUMENTS

| CN | 101620907 A | | 1/2010 |
| CN | 102424573 B | * | 2/2013 |
| EP | 1083158 A2 | | 3/2001 |
| JP | H092866 A | | 1/1997 |
| JP | 2001080952 A | | 3/2001 |

OTHER PUBLICATIONS

Japanese Patent Office, Office Action Issued in Application No. 2020-176040, Sep. 10, 2024, 6 pages.
(Continued)

*Primary Examiner* — Gerard Higgins
(74) *Attorney, Agent, or Firm* — McCoy Russell LLP

(57) ABSTRACT

A MnZn-based ferrite that can reduce the loss even when a high-frequency voltage fluctuation occurs is provided. The above MnZn-based ferrite is a MnZn-based ferrite including Fe2O3, ZnO, and MnO as main components, in which of Fe2O3 is 53.2 to 56.3 mol % and ZnO is 1.0 to 9.0 mol %, with a balance of MnO, in 100 mol % of the main components, and the MnZn-based ferrite includes 0.9 to 2.0% by mass of Co$_2$O$_3$, 0.005 to 0.06% by mass of SiO$_2$, and 0.01 to 0.06% by mass of CaO, as auxiliary components, per 100% by mass of the main components.

5 Claims, 1 Drawing Sheet

(52) U.S. Cl.
    CPC ................. *C04B 2235/3208* (2013.01); *C04B 2235/3244* (2013.01); *C04B 2235/3251* (2013.01); *C04B 2235/3262* (2013.01); *C04B 2235/3274* (2013.01); *C04B 2235/3275* (2013.01); *C04B 2235/3284* (2013.01); *C04B 2235/3418* (2013.01)

(58) Field of Classification Search
    CPC .... C04B 2235/3208; C04B 2235/3244; C04B 2235/3251; C04B 2235/3262; C04B 2235/3274; C04B 2235/3275; C04B 2235/3284; C04B 2235/3418; H01F 1/34; H01F 1/344
    See application file for complete search history.

(56)                References Cited

OTHER PUBLICATIONS

China National Intellectual Property Administration, Office Action and Search Report Issued in Application No. 202180069469.9, Feb. 26, 2024, 15 pages.
China National Intellectual Property Administration, Office Action Issued in Application No. 202180069469.9, Sep. 30, 2024, 12 pages.
China National Intellectual Property Administration, Office Action Issued in Application No. 202180069469.9, Jul. 16, 2024, 12 pages.

* cited by examiner

MnZn-BASED FERRITE

CROSS REFERENCE TO RELATED APPLICATIONS

The present application is a U.S. National Phase of International Application No. PCT/JP2021/029889 entitled "MnZn-BASED FERRITE," filed on Aug. 16, 2021. International Application No. PCT/JP2021/029889 claims priority to Japanese Patent Application No. 2020-176040 filed on Oct. 20, 2020. The entire contents of each of the above-listed applications are hereby incorporated by reference for all purposes.

TECHNICAL FIELD

The present invention relates to a MnZn-based ferrite.

BACKGROUND ART

A MnZn-based ferrite has properties such as a high initial magnetic permeability, a high magnetic flux density, and easy magnetization even in a small magnetic field, and is widely used in a communication device application, a power supply application, and the like. Various studies have been made on a MnZn-based ferrite so as to obtain a property according to the intended application (for example, Patent Literatures 1 and 2).

For example, Patent Literature 1 discloses, a specific low-loss ferrite for a liquid crystal backlight, containing main components consisting of 53.0 to 54.5 mol % of $Fe_2O_3$ and 6 to 12 mol % of ZnO, with a balance of MnO, and containing 200 to 1000 ppm of CaO, 0 to 300 ppm of $SiO_2$, and 100 to 4000 ppm of CoO and further containing 50 to 500 ppm of at least one of $Nb_2O_5$ and $Ta_2O_5$, as auxiliary components, as a ferrite that adjusts the temperature range with the minimum power loss to 20 to 60° C.

In addition, Patent Literature 2 discloses a specific magnetic ferrite material, containing iron oxide, zinc oxide, and manganese oxide as main components, in which zinc oxide at a content in the range of 7.0 to 9.0 mol % in terms of ZnO and manganese oxide at a content in the range of 36.8 to 39.2 mol % in terms of MnO are contained, with a balance of iron oxide, and containing cobalt oxide as an auxiliary component in the range of 2500 to 4500 ppm in terms of $Co_3O_4$, as a MnZn-based magnetic ferrite material having a low power loss in a wide temperature band and a small temperature change in power loss.

CITATION LIST

Patent Literature

Patent Literature 1: Japanese Unexamined Patent Application Publication No. H9-2866
Patent Literature 2: Japanese Unexamined Patent Application Publication No. 2001-80952

SUMMARY OF INVENTION

Technical Problem

With the downsizing and higher performance of an electronic device, increasing the switching frequency of a switching power supply to a higher switching frequency (for example, 1 to 3 MHz) or the like is being studied. The core material of an inductor that constitutes a switching power supply circuit is also required to have a low loss even at a high switching frequency.

The present invention solves the above problems and provides a MnZn-based ferrite that can reduce the loss even when a high-frequency voltage fluctuation occurs.

Solution to Problem

The MnZn-based ferrite according to the present invention includes $Fe_2O_3$, ZnO, and MnO as main components, in which $Fe_2O_3$ is 53.2 to 56.3 mol % and ZnO is 1.0 to 9.0 mol %, with a balance of MnO, in 100 mol % of the main components, and the MnZn-based ferrite includes 0.9 to 2.0% by mass of $Co_2O_3$, 0.005 to 0.06% by mass of $SiO_2$, and 0.01 to 0.06% by mass of CaO, as auxiliary components, per 100% by mass of the main components.

One embodiment of the above MnZn-based ferrite further includes 0.03 to 0.12% by mass in total of one or more selected from $ZrO_2$, $Ta_2O_5$, and $Nb_2O_5$, as an auxiliary component, per 100% by mass of the main components.

In one embodiment of the above MnZn-based ferrite, the hysteresis loop of a magnetization curve is a perminvar type.

One embodiment of the above MnZn-based ferrite has an initial magnetic permeability of 300 to 900 H/m.

One embodiment of the above MnZn-based ferrite has a residual magnetic flux density (Br) of 400 mT or less.

Advantageous Effects of Invention

According to the present invention, a MnZn-based ferrite that can reduce the loss even when a high-frequency voltage fluctuation occurs is provided.

BRIEF DESCRIPTION OF DRAWINGS

FIG. 1 is graphs showing the hysteresis loops of Comparative Example 9, Comparative Example 10, Example 35, Example 36, Example 38, and Comparative Example 12.

DESCRIPTION OF EMBODIMENTS

Hereinafter, the MnZn-based ferrite according to the present invention will be described.

Unless otherwise specified, the numerical range represented by using "to" includes the lower limit value and the upper limit value thereof.

<MnZn-based ferrite>

The MnZn-based ferrite according to the present invention (hereinafter, also referred to as the present MnZn-based ferrite) includes $Fe_2O_3$, ZnO, and MnO as main components, in which $Fe_2O_3$ is 53.2 to 60.0 mol % and ZnO is 1.0 to 9.0 mol %, with a balance of MnO, in 100 mol % of the main components, and the MnZn-based ferrite includes 0.9 to 2.0% by mass of $Co_2O_3$, 0.005 to 0.06% by mass of $SiO_2$, and 0.01 to 0.06% by mass of CaO, as auxiliary components, per 100% by mass of the main components.

It is presumed that because the present MnZn-based ferrite has the above composition, induced magnetic anisotropy is generated and the formation of the hysteresis loop into a perminvar type described later is promoted to reduce the loss when a high-frequency voltage fluctuation occurs, especially the hysteresis loss and the residual loss.

The hysteresis loop of a magnetization curve will be described with reference to FIG. 1. FIG. 1 is graphs showing the hysteresis loops of Comparative Example 9, Comparative Example 10, Example 35, Example 36, Example 38, and Comparative Example 12 in which the amount of $Co_2O_3$ was changed in Examples described later. The hysteresis loops in FIG. 1 were measured at an applied magnetic field of 100 A/m in the evaluation method "Residual magnetic flux density and hysteresis loop" of the Examples described later. Comparative Example 9 has a non-perminvar type hysteresis loop, Comparative Examples 10 and 12 each have a weak perminvar type hysteresis loop, and Examples 35, 36 and 38 each have a perminvar type hysteresis loop.

In each graph, the horizontal axis represents the magnetic field H, the vertical axis represents the magnetic flux density B, and the slope of the hysteresis loop in the vicinity of H=0 is the initial magnetic permeability u. In the non-perminvar type hysteresis loop, the initial magnetic permeability u and the residual magnetic flux density Br each have a large value. On the other hand, in the perminvar type hysteresis loop, the initial magnetic permeability u and the residual magnetic flux density Br each have a small value, and the magnetic flux density B follows a fluctuation in the magnetic field H, and thus the difference in magnetic flux density between when the magnetic field is changed in the positive direction and when the magnetic field is changed in the negative direction is small.

Because the present MnZn-based ferrite has the above composition, a perminvar type hysteresis loop can be obtained. As a result, it is presumed that the MnZn-based ferrite can reduce the hysteresis loss and the residual loss even when a high-frequency voltage fluctuation occurs.

In the present invention, the perminvar type, the weak perminvar type, and the non-perminvar type are defined as follows.

Perminvar type: $\mu \leq 700$ and Br (mT)$\leq 300$,

Weak perminvar type: $700 < \mu \leq 900$ and Br (mT)$\leq 400$, or $\mu \leq 900$ and $300 < Br$ (mT)$\leq 400$, and Non-perminvar type: $900 < \mu$ or $400 < Br$ (mT).

The present MnZn-based ferrite includes $Fe_2O_3$, ZnO, and MnO as main components.

$Fe_2O_3$ is 53.2 to 56.3 mol % in 100 mol % of the main components. When $Fe_2O_3$ is 53.2 mol % or more, a perminvar type hysteresis loop can be obtained, and $Fe_2O_3$ is preferably 53.8 mol % or more from the viewpoint of further reducing the loss. In addition, when $Fe_2O_3$ is 56.3 mol % or less, deterioration of the loss in a low temperature region can also be suppressed, and $Fe_2O_3$ is preferably 56.1 mol % or less, and more preferably 55.9 mol % or less, from the viewpoint of further reducing the loss.

ZnO is 1.0 to 9.0 mol % in 100 mol % of the main components. When ZnO is 1.0 mol % or more, the sinterability is excellent, and the productivity of the present MnZn-based ferrite is improved. When ZnO is 9.0 mol % or less, a perminvar type hysteresis loop can be obtained, and the loss is suppressed. ZnO is preferably 6.0 mol % or less from the viewpoint of further reducing the loss.

MnO is the balance of the main components (31 to 45.8 mol % in 100 mol % of the main components).

In addition, the present MnZn-based ferrite includes 0.9 to 2.0% by mass of $Co_2O_3$, 0.005 to 0.06% by mass of $SiO_2$, and 0.01 to 0.06% by mass of CaO, as auxiliary components, per 100% by mass of the main components.

When $Co_2O_3$ is 0.9% by mass or more, perminvar type formation is promoted. In addition, when $Co_2O_3$ is 2.0% by mass or less, deterioration of the loss in a low temperature region can also be suppressed, and $Co_2O_3$ is preferably 1.7% by mass or less.

When $SiO_2$ is 0.005% by mass or more, a grain boundary phase is sufficiently formed to suppress the loss and also improve the strength. In addition, when $SiO_2$ is 0.06% by mass or less, the enlargement of a crystal grain is suppressed. $SiO_2$ is preferably 0.02 to 0.05% by mass from the viewpoint of further reducing the loss.

When CaO is 0.01% by mass or more, a grain boundary phase is sufficiently formed to suppress the loss and also improve the strength. When CaO is 0.06% by mass or less, the enlargement of a crystal grain is suppressed. CaO is preferably 0.03 to 0.05% by mass from the viewpoint of further reducing the loss.

The present MnZn-based ferrite may further include a further component as long as the effects of the present invention are exhibited. Preferable components include $ZrO_2$, $Ta_2O_5$, and $Nb_2O_5$. These components may be included singly or in combinations of two or more. The total content of the further component is preferably 0.03 to 0.12% by mass per 100% by mass of the main components.

The present MnZn-based ferrite is preferably one in which the hysteresis loop of a magnetization curve is a perminvar type, particularly from the viewpoint of reducing the hysteresis loss and the residual loss.

The present MnZn-based ferrite preferably has an initial magnetic permeability u as described above of 300 to 900 H/m. When the initial magnetic permeability is within the range of 300 to 900 H/m, the loss is further reduced.

In addition, the present MnZn-based ferrite preferably has a residual magnetic flux density Br of 400 mT or less.

The present MnZn-based ferrite can be suitably used, for example, as a core material of an inductor used in a switching power supply circuit having a switching frequency of a high frequency (for example, 1 to 3 MHz).

<Method for Producing the Present MnZn-Based Ferrite>

The present MnZn-based ferrite may be appropriately selected from the methods by which the above properties are obtained. Hereinafter, a suitable method for producing a MnZn-based ferrite will be described with reference to an example.

First, $Fe_2O_3$, ZnO, and MnO, which are the main components, are blended in such a way as to have the above composition, and uniformly mixed, and granulated. The resulting powder may be calcined at, for example, about 650 to 950° C.

The resulting powder is disintegrated until the average particle diameter is less than about 1 $\mu$m, and the auxiliary components are added to the disintegrated powder in such a way as to have the above composition. The present MnZn-based ferrite can be obtained by uniformly mixing the resulting mixture and then firing the same at about 1150 to 1300° C.

EXAMPLES

Hereinafter, the present invention will be specifically described with reference to Examples and Comparative Examples. The present invention is not limited by the descriptions thereof.

Example 1

Each raw material powder was weighed and mixed such that after sintering, the $Fe_2O_3$ content was 56.3 mol %, the ZnO content was 4.0 mol %, and the MnO content was 39.7 mol % to make a total of 100 mol %. In the mixing step, the mixture was disintegrated by using an attritor until the average particle size of the mixture was 1.0 $\mu$m. Next, in a drying/granulation step, when the total mass of the above mixture was 100 parts by mass, 0.5 parts by mass of polyvinyl alcohol was added, and the resulting mixture was sprayed by using a spray dryer to obtain a granule. Next, the granule was calcined at 750° C. for 1 hour in an air atmosphere to obtain a calcined product.

Raw material powders of auxiliary components, respectively, were added such that $SiO_2$ was 0.03% by mass, CaO was 0.04% by mass, $ZrO_2$ was 0.075% by mass, and $Co_2O_3$ was 1.5% by mass, when the total mass of the obtained calcined product was 100 parts by mass.

Next, as a disintegration step, a mixture of the calcined product and the additives was disintegrated by using a disintegrator such that the median particle diameter D50 after disintegration was 0.5 μm or more and 1.0 μm or less, to obtain a disintegrated powder. Next, as a drying/granulation step, when the total mass of the disintegrated product was 100 parts by mass, 1 part by mass of polyvinyl alcohol was added to the disintegrated product, and the resulting mixture was sprayed by using a spray dryer to obtain a granule. The median diameter D50 of the granule at this time was 100 μm. Next, as a molding step and a sintering step, the granule was molded into a toroidal type core having an outer diameter of 16 mm, an inner diameter of 10 mm, and a height of 5 mm, and sintered at 1200° C. to obtain a sintered body (MnZn-based ferrite).

Examples 2 to 53 and Comparative Examples 1 to 12

Sintered bodies (MnZn-based ferrites) thereof were obtained in the same manner as in Example except that in Example 1, the blending proportions of the main components and the auxiliary components were changed to the blending proportions, respectively, shown in Tables 1 to 8.

Evaluation Methods (1) Initial Magnetic Permeability

A primary winding was wound 10 times around the molded toroidal type MnZn-based ferrite (core), and the initial magnetic permeability u at 10 KHz at 23° C. was measured by using an impedance analyzer.

(2) Residual Magnetic Flux Density and Hysteresis Loop

A primary winding was wound 25 times and a secondary winding was wound 25 times around the molded toroidal type core, and the hysteresis loop when a magnetic field of 1000 A/m was applied was measured by using a BH analyzer to determine the residual magnetic flux density Br.

(3) Core Loss (Pcv)

A primary winding was wound 5 times and the secondary winding 5 times around the molded toroidal type core, and Pcv was measured by using a BH analyzer under conditions of 1 MHz-50 mT in atmospheres of 25° C. and 120° C.

Results thereof are shown in Table 1 to Table 8.

TABLE 1

| | Main components [mol %] | | | Auxiliary components [% by mass] | | | | Evaluation items | | | | |
|---|---|---|---|---|---|---|---|---|---|---|---|---|
| | | | | | | | | Pcv | Pcv | Initial magnetic permeability μ | Residual magnetic flux density Br | Hysteresis |
| Example | $Fe_2O_3$ | MnO | ZnO | $SiO_2$ | CaO | $ZrO_2$ | $CO_2O_3$ | 25° C. | 120° C. | [H/m] | [mT] | loop |
| Comparative Example 1 | 56.4 | 39.6 | 4.0 | 0.03 | 0.04 | 0.075 | 1.5 | 760 | 320 | 280 | 330 | Weak perminvar |
| Example 1 | 56.3 | 39.7 | 4.0 | 0.03 | 0.04 | 0.075 | 1.5 | 490 | 280 | 300 | 300 | Perminvar |
| Example 2 | 56.2 | 39.8 | 4.0 | 0.03 | 0.04 | 0.075 | 1.5 | 350 | 250 | 320 | 280 | Perminvar |
| Example 3 | 56.1 | 39.9 | 4.0 | 0.03 | 0.04 | 0.075 | 1.5 | 290 | 220 | 350 | 250 | Perminvar |
| Example 4 | 55.9 | 40.1 | 4.0 | 0.03 | 0.04 | 0.075 | 1.5 | 240 | 200 | 380 | 220 | Perminvar |
| Example 5 | 55.6 | 40.4 | 4.0 | 0.03 | 0.04 | 0.075 | 1.5 | 180 | 150 | 410 | 180 | Perminvar |
| Example 6 | 55.3 | 40.7 | 4.0 | 0.03 | 0.04 | 0.075 | 1.5 | 140 | 180 | 430 | 190 | Perminvar |
| Example 7 | 55.0 | 41.0 | 4.0 | 0.03 | 0.04 | 0.075 | 1.5 | 150 | 200 | 450 | 210 | Perminvar |
| Example 8 | 54.7 | 41.3 | 4.0 | 0.03 | 0.04 | 0.075 | 1.5 | 170 | 220 | 510 | 230 | Perminvar |
| Example 9 | 54.4 | 41.6 | 4.0 | 0.03 | 0.04 | 0.075 | 1.5 | 200 | 230 | 550 | 240 | Perminvar |
| Example 10 | 54.1 | 41.9 | 4.0 | 0.03 | 0.04 | 0.075 | 1.5 | 220 | 240 | 590 | 250 | Perminvar |
| Example 11 | 53.8 | 42.2 | 4.0 | 0.03 | 0.04 | 0.075 | 1.5 | 230 | 250 | 610 | 260 | Perminvar |
| Examela 12 | 53.5 | 42.5 | 4.0 | 0.03 | 0.04 | 0.075 | 1.5 | 250 | 260 | 640 | 260 | Perminvar |
| Example 13 | 53.2 | 42.8 | 4.0 | 0.03 | 0.04 | 0.075 | 1.5 | 270 | 280 | 690 | 270 | Perminvar |
| Comparative Example 2 | 53.1 | 42.9 | 4.0 | 0.03 | 0.04 | 0.075 | 1.5 | 280 | 300 | 740 | 280 | Weak perminvar |

TABLE 2

| | Main components [mol %] | | | Auxiliary components [% by mass] | | | | Evaluation items | | | | |
|---|---|---|---|---|---|---|---|---|---|---|---|---|
| | | | | | | | | Pcv | Pcv | Initial magnetic permeability μ | Residual magnetic flux density Br | Hysteresis |
| Example | $Fe_2O_3$ | MnO | ZnO | $SiO_2$ | CaO | $ZrO_2$ | $CO_2O_3$ | 25° C. | 120° C. | [H/m] | [mT] | loop |
| Comparative Example 3 | 54.1 | 35.9 | 10 | 0.03 | 0.04 | 0.075 | 1.5 | 320 | 360 | 790 | 300 | Weak perminvar |
| Example 14 | 54.1 | 36.9 | 9.0 | 0.03 | 0.04 | 0.075 | 1.5 | 280 | 300 | 700 | 290 | Perminvar |
| Example 15 | 54.1 | 37.9 | 8.0 | 0.03 | 0.04 | 0.075 | 1.5 | 250 | 280 | 690 | 280 | Perminvar |
| Example 16 | 54.1 | 38.9 | 7.0 | 0.03 | 0.04 | 0.075 | 1.5 | 240 | 260 | 340 | 280 | Perminvar |
| Example 17 | 54.1 | 39.9 | 6.0 | 0.03 | 0.04 | 0.075 | 1.5 | 230 | 250 | 310 | 270 | Perminvar |

TABLE 2-continued

| | Main components [mol %] | | | Auxiliary components [% by mass] | | | | Pcv | Pcv | Initial magnetic permeability μ | Residual magnetic flux density Br | Hysteresis |
| Example | Fe$_2$O$_3$ | MnO | ZnO | SiO$_2$ | CaO | ZrO$_2$ | CO$_2$O$_3$ | 25° C. | 120° C. | [H/m] | [mT] | loop |
|---|---|---|---|---|---|---|---|---|---|---|---|---|
| Example 18 | 54.1 | 40.9 | 5.0 | 0.03 | 0.04 | 0.075 | 1.5 | 220 | 240 | 600 | 260 | Perminvar |
| Example 19 | 54.1 | 41.9 | 4.0 | 0.03 | 0.04 | 0.075 | 1.5 | 220 | 240 | 590 | 250 | Perminvar |
| Example 20 | 54.1 | 42.9 | 3.0 | 0.03 | 0.04 | 0.075 | 1.5 | 210 | 243 | 560 | 240 | Perminvar |
| Example 21 | 54.1 | 43.9 | 2.0 | 0.03 | 0.04 | 0.075 | 1.5 | 180 | 200 | 530 | 230 | Perminvar |
| Example 22 | 54.1 | 44.9 | 1.0 | 0.03 | 0.04 | 0.075 | 1.5 | 200 | 230 | 500 | 230 | Perminvar |

TABLE 3

| | Main components [mol %] | | | Auxiliary components [% by mass] | | | | Pcv | Pcv | Initial magnetic permeability μ | Residual magnetic flux density Br | Hysteresis |
| Example | Fe$_2$O$_3$ | MnO | ZnO | SiO$_2$ | CaO | ZrO$_2$ | CO$_2$O$_3$ | 25° C. | 120° C. | [H/m] | [mT] | loop |
|---|---|---|---|---|---|---|---|---|---|---|---|---|
| Comparative Example 4 | 54.1 | 41.9 | 4.0 | 0 | 0.04 | 0.075 | 1.5 | 300 | 340 | 580 | 250 | Perminvar |
| Example 23 | 54.1 | 41.9 | 4.0 | 0.01 | 0.04 | 0.075 | 1.5 | 250 | 270 | 600 | 240 | Perminvar |
| Example 24 | 54.1 | 41.9 | 4.0 | 0.02 | 0.04 | 0.075 | 1.5 | 230 | 250 | 600 | 240 | Perminvar |
| Example 25 | 54.1 | 41.9 | 4.0 | 0.03 | 0.04 | 0.075 | 1.5 | 220 | 240 | 590 | 250 | Perminvar |
| Example 26 | 54.1 | 41.9 | 4.0 | 0.04 | 0.04 | 0.075 | 1.5 | 220 | 230 | 580 | 260 | Perminvar |
| Example 27 | 54.1 | 41.9 | 4.0 | 0.05 | 0.04 | 0.075 | 1.5 | 230 | 250 | 600 | 240 | Perminvar |
| Example 28 | 54.1 | 41.9 | 4.0 | 0.06 | 0.04 | 0.075 | 1.5 | 250 | 300 | 650 | 270 | Perminvar |
| Comparative Example 5 | 54.1 | 41.9 | 4.0 | 0.07 | 0.04 | 0.075 | 1.5 | 500 | 630 | 900 | 280 | Weak perminvar |

TABLE 4

| | Main components [mol %] | | | Auxiliary components [% by mass] | | | | Pcv | Pcv | Initial magnetic permeability μ | Residual magnetic flux density Br | Hysteresis |
| Example | Fe$_2$O$_3$ | MnO | ZnO | SiO$_2$ | CaO | ZrO$_2$ | CO$_2$O$_3$ | 25° C. | 120° C. | [H/m] | [mT] | loop |
|---|---|---|---|---|---|---|---|---|---|---|---|---|
| Comparative Example 6 | 54.1 | 41.9 | 4.0 | 0.03 | 0 | 0.075 | 1.5 | 330 | 370 | 580 | 230 | Perminvar |
| Example 29 | 54.1 | 41.9 | 4.0 | 0.03 | 0.01 | 0.075 | 1.5 | 270 | 290 | 580 | 240 | Perminvar |
| Example 30 | 54.1 | 41.9 | 4.0 | 0.03 | 0.02 | 0.075 | 1.5 | 250 | 270 | 590 | 250 | Perminvar |
| Example 31 | 54.1 | 41.9 | 4.0 | 0.03 | 0.03 | 0.075 | 1.5 | 230 | 250 | 580 | 260 | Perminvar |
| Example 32 | 54.1 | 41.9 | 4.0 | 0.03 | 0.04 | 0.075 | 1.5 | 220 | 240 | 590 | 250 | Perminvar |
| Example 33 | 54.1 | 41.9 | 4.0 | 0.03 | 0.05 | 0.075 | 1.5 | 230 | 250 | 620 | 260 | Perminvar |
| Example 34 | 54.1 | 41.9 | 4.0 | 0.03 | 0.06 | 0.075 | 1.5 | 260 | 280 | 640 | 270 | Perminvar |
| Comparative Example 7 | 54.1 | 41.9 | 4.0 | 0.03 | 0.07 | 0.075 | 1.5 | 550 | 650 | 880 | 280 | Weak perminvar |

TABLE 5

| | Main components [mol %] | | | Auxiliary components [% by mass] | | | | Pcv | Pcv | Initial magnetic permeability μ | Residual magnetic flux density Br | Hysteresis |
| Example | Fe$_2$O$_3$ | MnO | ZnO | SiO$_2$ | CaO | ZrO$_2$ | CO$_2$O$_3$ | 25° C. | 120° C. | [H/m] | [mT] | loop |
|---|---|---|---|---|---|---|---|---|---|---|---|---|
| Comparative Example 8 | 54.1 | 41.9 | 4.0 | 0.03 | 0.04 | 0.075 | 0 | 1500 | 1100 | 800 | 470 | Non-perminvar |
| Comparative Example 9 | 54.1 | 41.9 | 4.0 | 0.03 | 0.04 | 0.075 | 0.4 | 1050 | 700 | 710 | 410 | Non-perminvar |
| Comparative Example 10 | 54.1 | 41.9 | 4.0 | 0.03 | 0.04 | 0.075 | 0.6 | 500 | 380 | 630 | 330 | Weak perminvar |

TABLE 5-continued

| | Main components [mol %] | | | Auxiliary components [% by mass] | | | | Pcv | Pcv | Initial magnetic permeability μ | Residual magnetic flux density Br | Hysteresis |
|---|---|---|---|---|---|---|---|---|---|---|---|---|
| Example | $Fe_2O_3$ | MnO | ZnO | $SiO_2$ | CaO | $ZrO_2$ | $Co_2O_3$ | 25° C. | 120° C. | [H/m] | [mT] | loop |
| Comparative Example 11 | 54.1 | 41.9 | 4.0 | 0.03 | 0.04 | 0.075 | 0.8 | 320 | 310 | 620 | 310 | Weak perminvar |
| Example 35 | 54.1 | 41.9 | 4.0 | 0.03 | 0.04 | 0.075 | 0.9 | 240 | 250 | 600 | 200 | Perminvar |
| Example 36 | 54.1 | 41.9 | 4.0 | 0.03 | 0.04 | 0.075 | 1.4 | 130 | 200 | 590 | 250 | Perminvar |
| Example 27 | 54.1 | 41.9 | 4.0 | 0.03 | 0.04 | 0.075 | 1.7 | 220 | 210 | 550 | 280 | Perminvar |
| Example 38 | 54.1 | 41.9 | 4.0 | 0.03 | 0.04 | 0.075 | 2.0 | 1350 | 230 | 410 | 300 | Perminvar |
| Comparative Example 12 | 54.1 | 41.9 | 4.0 | 0.03 | 0.04 | 0.075 | 2.2 | 2360 | 460 | 310 | 390 | Weak perminvar |

TABLE 6

| | Main components [mol %] | | | Auxiliary components [% by mass] | | | | Pcv | Pcv | Initial magnetic permeability μ | Residual magnetic flux density Br | Hysteresis |
|---|---|---|---|---|---|---|---|---|---|---|---|---|
| Example | $Fe_2O_3$ | MnO | ZnO | $SiO_2$ | CaO | $ZrO_2$ | $Co_2O_3$ | 25° C. | 120° C. | [H/m] | [mT] | loop |
| Example 39 | 54.1 | 41.9 | 4.0 | 0.03 | 0.04 | 0.000 | 1.5 | 330 | 370 | 560 | 220 | Perminvar |
| Example 40 | 54.1 | 41.9 | 4.0 | 0.03 | 0.04 | 0.020 | 1.5 | 320 | 340 | 570 | 240 | Perminvar |
| Example 41 | 54.1 | 41.9 | 4.0 | 0.03 | 0.04 | 0.030 | 1.5 | 270 | 290 | 590 | 250 | Perminvar |
| Example 42 | 54.1 | 41.9 | 4.0 | 0.03 | 0.04 | 0.050 | 1.5 | 230 | 250 | 580 | 240 | Perminvar |
| Example 43 | 54.1 | 41.9 | 4.0 | 0.03 | 0.04 | 0.075 | 1.5 | 220 | 240 | 590 | 250 | Perminvar |
| Example 44 | 54.1 | 41.9 | 4.0 | 0.03 | 0.04 | 0.100 | 1.5 | 230 | 250 | 630 | 260 | Perminvar |
| Example 45 | 54.1 | 41.9 | 4.0 | 0.03 | 0.04 | 0.120 | 1.5 | 260 | 280 | 640 | 260 | Perminvar |

TABLE 7

| | Main components [mol %] | | | Auxiliary components [% by mass] | | | | Pcv | Pcv | Initial magnetic permeability μ | Residual magnetic flux density Br | Hysteresis |
|---|---|---|---|---|---|---|---|---|---|---|---|---|
| Example | $Fe_2O_3$ | MnO | ZnO | $SiO_2$ | CaO | $ZrO_2$ | $Co_2O_3$ | 25° C. | 120° C. | [H/m] | [mT] | loop |
| Example 46 | 54.1 | 41.9 | 4.0 | 0.03 | 0.04 | 0 | 1.5 | 340 | 370 | 560 | 220 | Perminvar |
| Example 47 | 54.1 | 41.9 | 4.0 | 0.03 | 0.04 | 0.03 | 1.5 | 280 | 290 | 600 | 240 | Perminvar |
| Example 48 | 54.1 | 41.9 | 4.0 | 0.03 | 0.04 | 0.075 | 1.5 | 220 | 240 | 590 | 250 | Perminvar |
| Example 49 | 54.1 | 41.9 | 4.0 | 0.03 | 0.04 | 0.12 | 1.5 | 260 | 270 | 650 | 250 | Perminvar |

TABLE 8

| | Main components [mol %] | | | Auxiliary components [% by mass] | | | | Pcv | Pcv | Initial magnetic permeability μ | Residual magnetic flux density Br | Hysteresis |
|---|---|---|---|---|---|---|---|---|---|---|---|---|
| Example | $Fe_2O_3$ | MnO | ZnO | $SiO_2$ | CaO | $ZrO_2$ | $Co_2O_3$ | 25° C. | 120° C. | [H/m] | [mT] | loop |
| Example 50 | 54.1 | 41.9 | 4.0 | 0.03 | 0.04 | 0 | 1.5 | 340 | 370 | 570 | 220 | Perminvar |
| Example 51 | 54.1 | 41.9 | 4.0 | 0.03 | 0.04 | 0.03 | 1.5 | 280 | 290 | 600 | 230 | Perminvar |
| Example 52 | 54.1 | 41.9 | 4.0 | 0.03 | 0.04 | 0.075 | 1.5 | 230 | 250 | 590 | 250 | Perminvar |
| Example 53 | 54.1 | 41.9 | 4.0 | 0.03 | 0.04 | 0.12 | 1.5 | 270 | 270 | 650 | 250 | Perminvar |

Summary of Results

It was shown that the MnZn-based ferrites of Examples 1 to 53 above each had a perminvar type hysteresis loop and has a reduced loss even when a voltage fluctuation at a high frequency of 1 MHz occurs, in which the MnZn-based ferrites contained $Fe_2O_3$, ZnO, and MnO as main components, in which $Fe_2O_3$ was 53.2 to 56.3 mol % and ZnO was 1.0 to 9.0 mol %, with a balance of MnO, in 100 mol % of the main components, and the MnZn-based ferrites contained 0.9 to 2.0% by mass of $Co_2O_3$, 0.005 to 0.06% by mass of $SiO_2$, and 0.01 to 0.06% by mass of CaO, as auxiliary components, per 100% by mass of the main components.

The present application claims priority based on Japanese Patent Application No. 2020-176040 filed on Oct. 20, 2020, the disclosure of which is incorporated herein by reference in its entirety.

The invention claimed is:

1. A MnZn-based ferrite comprising $Fe_2O_3$, ZnO, and MnO as main components, wherein Fe2O3 is 53.2 to 56.3 mol % and ZnO is 1.0 to 6.0 mol %, with a balance of MnO, in 100 mol % of the main components, and the MnZn-based ferrite comprises 0.9 to 2.0% by mass of Co2O3, 0.005 to 0.06% by mass of SiO2, and 0.01 to 0.06% by mass of CaO, as auxiliary components, per 100% by mass of the main components.

2. The MnZn-based ferrite according to claim 1, further comprising 0.03 to 0.12% by mass in total of one or more selected from ZrO2, Ta2O5, and Nb2O5, as a further auxiliary component, per 100% by mass of the main components.

3. The MnZn-based ferrite according to claim 1, wherein the MnZn-based ferrite has a hysteresis loop of a magnetization curve is a perminvar type.

4. The MnZn-based ferrite according to claim 1, wherein the MnZn-based ferrite has an initial magnetic permeability of 300 to 900.

5. The MnZn-based ferrite according to claim 1, wherein the MnZn-based ferrite has a residual magnetic flux density (Br) of 400 mT or less.

* * * * *